United States Patent [19]

Kasner

[11] Patent Number: 4,877,218
[45] Date of Patent: Oct. 31, 1989

[54] DRAIN VALVE DEVICE

[75] Inventor: Clayton S. Kasner, North Canton, Ohio

[73] Assignee: Design Improvement Corporation, Akron, Ohio

[21] Appl. No.: 188,352

[22] Filed: Apr. 29, 1988

Related U.S. Application Data

[63] Continuation-in-part of Ser. No. 863,366, May 15, 1986, abandoned.

[51] Int. Cl.⁴ .......................................... F16K 31/126
[52] U.S. Cl. .................................. 251/61.3; 137/203; 251/239; 251/295
[58] Field of Search ................. 137/203; 251/86, 61.3, 251/63.5, 25, 321, 295, 239

[56] References Cited

U.S. PATENT DOCUMENTS

| | | | |
|---|---|---|---|
| 1,636,769 | 7/1927 | Forman | 251/61.3 X |
| 2,144,427 | 1/1939 | Longstreet | 251/321 |
| 2,710,594 | 6/1955 | Thompson | 251/321 X |
| 3,675,896 | 7/1972 | Mercier | 251/321 |
| 4,030,517 | 6/1977 | Pyle | 137/203 |
| 4,431,160 | 2/1984 | Burt et al. | 251/86 |
| 4,752,445 | 6/1988 | Zell | 251/61.3 X |

Primary Examiner—Stephen M. Hepperle
Attorney, Agent, or Firm—Renner, Kenner, Greive, Bobak, Taylor & Weber

[57] ABSTRACT

A drain valve device mounted on the bottom of a pressure tank for the purpose of disposing of unwanted, accumulated waste liquids in the tank. The valve portion of the device is of a type comprising a stem-mounted disc moving longitudinally against, or away from a valve seat in the process of closing or opening the valve, rspectively. Movement of the stem is achieved by means of a pivotally mounted valve operating lever, or by air pressure. The valve includes as special features thereof limited contact between the disc and the valve seal; a specially positioned valve seat which provides a pressure relief safety feature; a non-jamming spring configuration with positioning means therefore, and a self-aligning stem. In one of the preferred embodiments, a constricted opening is provided in the outlet of the valve to create an audible signal and to reduce loss of pressure when the valve is in its open position, draining the tank.

7 Claims, 2 Drawing Sheets

DRAIN VALVE DEVICE

This is a continuation-in-part application of prior patent application Ser. No. 863,366 filed May 15, 1986 now abandoned.

TECHNICAL FIELD

This invention relates to a drain valve device for vessels, particularly those containing gas under pressure greater than atmospheric. More particularly, this invention relates to a drain valve device equipped with a quick opening dump mechanism. Specifically, however, this invention relates to a seated disc-type valve, operated automatically or with a manually operated lever opening device, in combination with, and for the purpose of draining contaminants from containers holding gas under pressure, especially gas storage vessels.

BACKGROUND OF THE INVENTION

All gases, including air, contain moisture. When a gas is compressed to the point at which its moisture content can no longer remain in a vapor state, it precipitates as a liquid. This is a very serious problem in any compressed gas operation, and as a practical matter, compressed air must be kept as dry as possible in order for it to be of any commercial value. For example, water interferes with air operated equipment by rusting components, mixing with any oil present to form sludge and varnish, and freezing the equipment in cold weather. This results in the delivery of less power than would otherwise be available, since water adds to the mass of the air flow and, therefore, to the friction within the delivery system itself. Furthermore, because water is incompressible, it cannot contribute to the production of power, for instance in air tools.

Water also causes damage by virtue of its accumulation in the compressed gas receivers with which virtually all compressors are associated. Air receivers are required since they act as a storage vessel for the compressed gas, so that the compressing equipment will not over-heat due to continuous operation. In addition, the compressor motor and pump do not have to cycle as much each time there is a demand for air, inasmuch as air is already stored in the receiver, ready for use. The latter factor is important since frequent start-up of the compressor is a major cause of motor failure. An air receiver also eliminates the pulsations generated by the compression equipment, allowing smoother power delivery.

Once the air is stored in the receiver, however, it has a chance to cool, permitting water separation to occur in the receiver itself as the moisture precipitates during cooling. This produces denser air, allowing more power to be delivered to the application; however, the water must be removed for reasons which include those previously described. It is the removal of such water and associated waste to which the invention addresses itself.

When acquisition of a compressed air system is under consideration, the pump, motor and receiver tank sizing are given careful thought. Such sizing is important because a 3 horsepower compressor cannot be used when more compressing capacity is needed. Likewise, the use of a 20 horsepower compressor when a 10 horsepower unit would be adequate is wasteful. Consequently, all of the demands on the compressed air system are taken into consideration at the time of system design, and the receiver size is usually matched to the compressor's capacity to produce air, the latter, in turn, being matched to the rate at which compressed air is required by the application.

While receiver size is usually dictated by the horsepower of the compressor, it's size may be varied somewhat, and there are general sizing guidelines commonly used in the industry. For instance, an 80 gallon tank is considered standard for a 5 horsepower air compressor, and while a smaller or larger receiver is sometimes used with such a compressor, experience has shown that a tank of that size strikes an optimum compromise between size, cost, and the amount of energy involved in filling it. It is understood, however, that if a larger storage vessel is needed, a larger compressor is required to handle the application.

Air storage requirements, the need to limit compressor cycling, and the provision of sufficient storage space to allow the air to cool before use all influence receiver sizing; consequently, different circumstances dictate the use of different receivers. Generally speaking, larger receivers are used with larger horsepower compressors, since the amount of air flowing through them is so great that smaller receivers would not accomodate influencing factors such as those described in the preceding.

While it is advantageous that the air in the receiver cool, and that the water separate from it, the accumulation of water in the receiver must be avoided. For example, when the water accumulates, it takes up space in the tank, effectively reducing the capacity of the receiver. Since water cannot be compressed, an 80 gallon tank half full of water has only 40 gallons of space left for air storage. It is apparent, therefore, that if the receiver capacity has been halved, and that it takes only half as much time to empty, and half as much time to fill. This means that the compressor has to cycle on and off twice as often as would otherwise be the case, and that and it pumps only half as long during each cycle. It is this "rapid cycling" that destroys compressor motors since the inertial start-up loads are so extremely large. The armature in larger integral horse power motors may, for instance, weigh as much as 100 pounds by itself, and the motor must also turn the compressor pump from a standing start, all of which creates a severe strain on the motor. If repeated too often, the strain causes the motor to wear out quickly, and it is, as stated, one of the problems associated with water accumulation inside air receivers.

A further problem encountered when the receiver capacity has been reduced by water is that it takes proportionally less time for the air in the receiver to be consumed because there is less air stored to begin with. The air in the receiver also has less time to cool, and as a consequence, air leaving the tank is warmer, less dense, and wetter, reducing the amount of air power delivered to the equipment, and increasing the amount of water entering it. The result is the rapid destruction of air operated tools and equipment. For all the preceding reasons, therefore, it is important to assure that the receiver be kept as clean as possible.

While all receivers have provision for bottom drainage, it is difficult to find a valve suitable for the purpose. In this regard, receiver tank drainage provides a severe test for any drain valve, due to the fact that the inside of the tank corrodes as a consequence of water condensing on its sides, resulting in the distribution of particulate scale matter over its bottom surface. At the same time, oil from the compressor intermixes with scale from the compressor head, and from the pipes leading to the receiver, forming a mixture that combines with the water and scale present on the inside of the tank to form an acidic sludge which corrodes and plugs conventional drain valves, tending to render them inoperative. When allowed to dry, the sludge, particulate matter, etc., forms a hard plaque not unlike cement, providing a difficult task for any valve to accomodate.

The valve of the invention is designed to handle this difficult application, however, and all features of the valve, from the type of materials used in its construction, to the unique dished-out face, are intended for use where the material to be drained is not clean water, but rather is a combination of substances, including particulate matter, and where the pressurized integrity of the vessel must be maintained, as in the case of the receivers referred to.

DISCLOSURE OF THE INVENTION

In view of the preceding, therefore, it is one aspect of this invention to provide a drain valve device useful in intermittently draining liquid from pressure vessels, while otherwise maintaining the vessel's pressurized integrity.

It is an additional aspect of the invention to provide a drain valve device which is quickly activated to its open position, either automatically, or by a lever means operated by foot or hand pressure.

A further aspect of the invention is to provide a reliable device for draining unwanted effluent and waste from pressure vessels, which may be operated at required intervals determined by the time during which the pressure vessel has been accumulating such liquids.

Another aspect of this invention is to provide a drain valve device of simple construction which is easy to install and maintain, and which is relatively free from the failures resulting from the adverse conditions of the environment in which the device is located.

The foregoing and other aspects of the invention which will become apparent as the detailed description proceeds, are achieved by a drain valve device comprising a valve with a stem-mounted disc activated between opened and closed positions by longitudinal movement of the stem, and corresponding movement of the disc, against or away from the valve seat; a valve actuator mounted on said valve adapted to exert a force on said stem, thereby moving the stem and forcing said disc away from its seat, thus opening the valve, wherein said valve is equipped with a spring to return it to its closed position when said force is removed, and wherein the valve seat is comprised of a replacable, pressure deformable, resiliant material, and wherein further, the inner surface of said disc facing said valve seat is recessed so as to provide a peripheral land on said inner surface, thereby limiting the area of contact between said valve seat and said disc in the valve's closed position to the surface area of the land.

Other aspects of the invention will be obtained by a combination comprising a drain valve device having a valve with a stem-mounted disc activated between open and closed positions by longitudinal movement of the stem, and corresponding movement of the disc, against or away from the valve seat, the inner surface of said disc facing said valve seat being recessed so as to provide a peripheral land on said inner surface, thereby limiting the area of contact between said valve seat and said disc in the valve's closed position to the surface area of the land; a valve actuator mounted on said valve and adapted to exert a force on the stem, thereby moving the stem and, therefore, moving the disc away from said seat, thus opening the valve; a spring adapted to force the disc back against said seat, thus closing the valve, and a vessel to which such valve is attached, whereby contaminants may be drained from the vessel when desired.

BRIEF DESCRIPTION OF THE DRAWINGS

The invention will be more fully understood from the following detailed description, taken in connection with the accompanying drawings, wherein like-numbers refer to like-parts, and wherein.

BEST MODE FOR CARRYING OUT THE INVENTION

Figure 1:
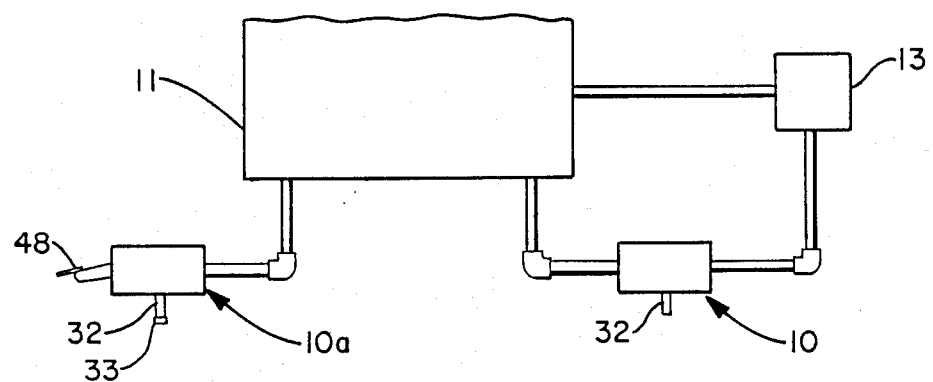
FIG. 1 is a side elevation of two different embodiments of the drain valve device of the invention in their position of use attached to a vessel.

Referring to the drawings, FIG. 1 shows a side elevation of a pressure receiver vessel or tank 11 to which are mounted two different embodiments of the invention, generally 10, and 10a, respectively. An automatic dump valve 10 is shown attached to the bottom of a pressure vessel 11 and to a dump valve control unit 13, the latter also being attached to the pressure vessel. A manual dump valve 10a connected to the vessel is also shown.

The discharge of automatic dump valve 10 is determined by controller 13, which may be of a type designed to activate the valve at regular intervals, for specific periods of discharge. The intervals of time may depend upon the conditions of operation, the type of equipment involved, and similar factors, and may, for example, be set to discharge at intervals of from about 1 to 100 minutes. The length of the discharge will likewise depend upon operating factors; however, discharge periods will ordinarily not exceed several seconds.

The manually operated valve 10a is activated by an operator, either by foot or by hand, until the accumulated waste in vessel 11 has been discharged. Completion of discharge can quickly and easily be determined by observing the absence of liquid discharge, or in the case of a vessel under pressure, by the sound of gas escaping under pressure. In a preferred embodiment, the valve is proided with an effluent discharge nipple 32, fitted with a whistle device 33 which may, for example, be a plug fitted with a constricted opening such as a small hole drilled in its center. The constricted opening reduces the amount of gas escaping before the valve can be closed, after all the waste has been drained. However, it also increases the velocity of the gas escaping at the end of the draining operation, and makes its escape more audible. While the size of the hole is not critical, depending upon the pressures involved, the size of the valve, and similar considerations, the diameter of the hole may desirably vary from about 3/32 inch to about 1/16 inch, with particular advantages being obtained from a hole about 7/16 inch in diameter. When draining has been completed, the lever is released, allowing the valve to return to its closed position.

The time at which discharge of effluent waste from the vessel should be undertaken is influenced by such factors as the length of time since the last discharge, the amount of usage of the system in the intervening period, the nature of the gas and waste being handled, the temperatures involved, and similar considerations. In the case of compressed air storage tanks, such discharge is usually performed at least on a daily basis.

Figure 2:
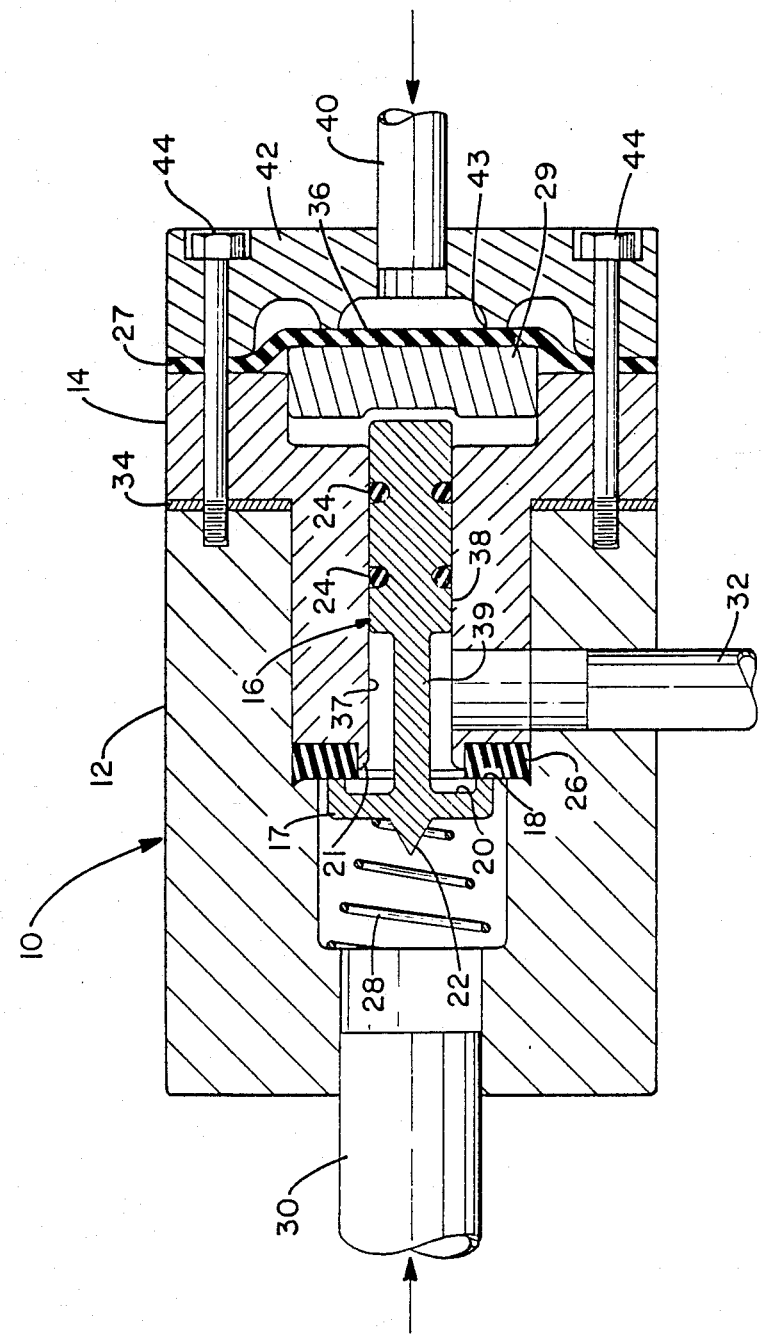
FIG. 2 is a cross-section of an automatic drain valve device of the invention showing the internal working details of the valve.

FIG. 2 shows a cross-sectional view of an automatic valve 10 having a circular cross-section transverse to the horizontal axis of the Figure. The external body portions of the valve comprise a valve housing 12, a valve stem housing 14, and an end cap 42, all of which are held together by six bolts 44 equally spaced adjacent to the circular periphery of the valve. A valve stem, generally 16, is positioned within a center bore 37 in valve stem housing 14, and is provided with O-rings 24 as a seal therefor. The valve stem 16 includes a piston portion 38, a shaft 39, and a valve stem disc 17. The valve stem disc 17 is provided with a dished-out, face recess 20, leaving a face land 18 adjacent the periphery of the disc. The valve stem disc 17 is also provided with a disc cone 22 on its lower or pressure face, and a valve spring 28 positioned adjacent the disc cone. A valve seat 26 is located in an annular groove at the smaller diameter, lower end of the valve stem housing 14. A circular actuator piston 29 is positioned between a flexible diaphragm 27 and the end of the stem piston 38, while a sealing gasket 34 is positioned between valve housing 12 and valve stem housing 14. The valve is connected to the receiver vessel to be drained at effluent inlet 30, the effluent waste leaving the valve through the effluent discharge port 32.

The valve is actuated to its discharge, or dump position by air entering air control inlet 40, which pushes against diaphragm 27 and actuator piston 29 moving the latter away from end cap stop-ridge 43, and against the end of stem piston 38. The force thus generated pushes the disc face land 18 away from valve seat 26, allowing the discharge effluent to flow through the inlet 30, around the space created between the land 18 and the seat 26, around the stem shaft 39, and finally, out the effluent discharge port 32. When the control air supply is shut off, the process is reversed, the valve spring 28 forcing the disc face land 18 back against the valve seat 26, shutting off the effluent discharge.

While drain valves are essential in pressure vessels, for the reasons previously stated, it is extremely difficult to assure the positive seating of such valves in their closed position, which is essential to the maintenance of pressure in the vessel. This is due to the accumulation of sludge, scale, and other contaminating sediments in the valve. Such sediments, for example, have a tendency to become lodged between the seat of the valve and the disc face, preventing the valve from completely closing. Furthermore, the sediment problem also hinders the action of cylindrical valve springs, sometimes accumulating on the coils of such springs, interfering with spring compression, and thus obstructing the proper opening of the valve. The valve shown is provided with a number of important improved features, described in the following, which avoid these difficulties, and make the valve highly reliable in drain service.

The recess 20 provided in the disc face surface, for example, limits the area of the face in contact with the disc 17 to the area of land 18. The limited surface of valve seat contact thus afforded greatly minimizes the area available for accumulation of particulate contamination, and it also increases the unit-loading of the contact surface against the disc. Both effects tend to provide reliable seating, irrespective of the amount of sediment contained in the discharge effluent. With respect to the size of the land 18, it has been found desirable to limit to it a width of from about 0.035 inch to 0.045 inch, a width of about 0.040 inch, however, being preferred.

Related to the elimination of sedimentation within the valve is the provision of the disc cone 22, which not only serves to securely position the smaller diameter, upper end of valve spring 28 against the disc 17, but also importantly, acts as an air spoiler to reduce the turbulence created by sudden changes in the effluent discharge stream, thus maintaining a smooth flow of the waste material, and accompanying air discharged. The smooth flow thus induced permits the complete purging of the valve, and greatly reduces the likelihood of sediment accumulation in the dead air spaces, which often results from flow turbulence. While cones with taper angles having different values can help to provide the effects described, it is preferable that the cone have a taper of from about 20° to 45°, relative to the vertical axis of the valve stem 16, and a taper angle of about 30° is commonly employed.

Although a variety of springs can be employed in dump valves, it has been determined that a conical spring is unusally beneficial in avoiding interference of accumulated sediment on the surface of the spring with the spring's compression. As stated, when a cylindrical spring is used, sediment tends to accumulate on the exposed surfaces, jamming the spring by limiting the degree to which the spring can be compressed. It has been found, however, that such an accumulation poses no problem with a conical spring, since adjacent coil surfaces do not contact each other, even when the spring is compressed. Provision of a conical spring, therefore, is an additional feature which provides notable advantages for the valve in receiver vessel draining service.

A further advantage of the valve of the invention is to be found in the provision of the annular groove in which valve seat 26 rests. The groove as constructed forms an annular lip 21 on the valve stem housing. The lip functions as a safety relief valve when the valve stem disc is subjected to dagerously elevated pressures. In such cases, the face land 18 compresses the valve seat 26 to such an extent that the surface of the face recess 20 is forced against lip 21, and no more compression of the valve seat is possible. This limits the sealing ability of the contact between the face land 18 and the valve seat 26, so that further pressure escapes at the contact point and discharges safely through discharge port 32.

Proper operation of the valve requires that the valve stem 16 move parallel to the longitudinal axis of the center bore 37 of valve stem housing 14. In other words, if the movement of valve stem 16 occurs at an angle to the bore 37, a wobbling movement can occur, sometimes resulting in the valve stem being placed in a "cocked" position which interferes with proper seating of the valve. While close fabrication tolerances can help eliminate the problem, it has been found that the ratio of the length of the valve piston 38 to the piston's diameter can have an important beneficial affect in helping to eliminate the problem. Specifically, it has been found that the stem is self-aligning and stem wobble is virtually eliminated if such ratio is not less than about 1.2 to 1, with about 1.8 to 1 being particularly advantageous.

In a preferred embodiment, the control air inlet 40 is supplied with compressed air from the vessel being drained. Therefore, the air pressure forcing the valve stem disc 17 against valve seat 26, is the same as that being applied to diaphragm 27. In such case, so long as the diameter of actuator piston 29 is greater than that of the valve stem disc 17, the air pressure entering air inlet 40 from the controller 13 will always be sufficient to open the valve for draining.

Figure 3:
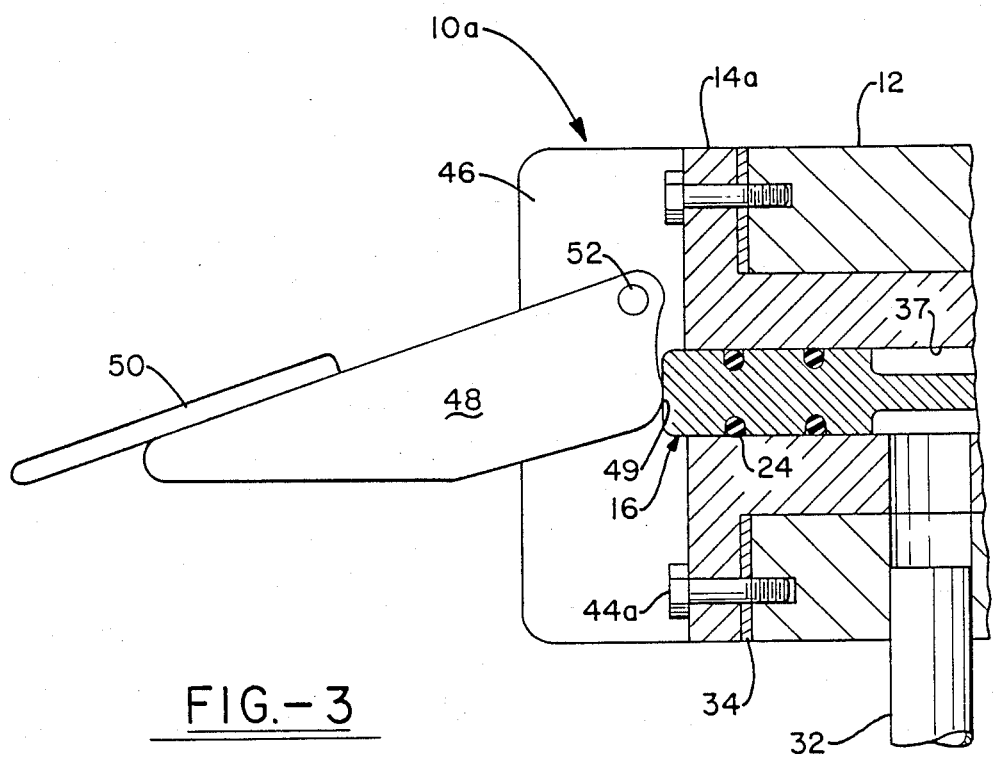
FIG. 3 is a partial cross-section of a manually operated drain valve device of the invention showing the interaction of the actuating lever with the valve stem.

FIG. 3 is a partial cross-section of a manually operated valve of the invention, generally 10a, showing details of the actuating mechanism. The portion of the valve relating to valve seat 26, the valve stem disc 17, and related structure is identical to that previously discussed in connection with FIG. 3. In the Figure, a valve stem housing 14a is connected to valve housing 12 by bolts identical to the bolts 44 of FIG. 2, but which, however, are not shown in FIG. 3. The valve stem housing 14a has a vertical slot 46 which extends through the end thereof, with an actuating lever 48, a plate-like extension provided with a lever pedal 50, usually round, mounted thereon. The lever is pivotable about pivot pin 52 which extends through the lever slot 46, and is attached to valve stem housing 14a. The valve is actuated when an operator moves the actuating lever 48 by stepping on lever pedal 50, or moves the lever by hand. When lever 48 is thus depressed, lever face 49 pushes valve stem 16 within its associated bore 37, forcing the disc face land 18 away from valve seat 26, opening the valve. When the operating force is removed from lever 48, the valve spring 28 forces the valve stem 16 in the reverse direction, restoring the lever to its original position, and forcing the disc face land 18 back against valve seat 26. As in the case of the valve of FIG. 2, gasket 34 is positioned between valve housing 12 and valve stem housing 14a, and O-rings 24 seal the valve stem 16 within the bore 37 of the valve stem housing. Discharge through the valve is from port 32, as previously described.

Valve seat 26 is formed from relatively resilient, pressure deformable materials in order to assure a substantially liquid-tight seal with disc face land 18. Elastomeric materials, for example, natural and synthetic rubber, as well as other resilient substances having similar properties may all be successfully employed for the purpose. The selection will depend upon the nature of the liquids to be encountered, and the conditions of the service to which the drain valve device is to be exposed.

The dimensions of the valve, other than as described, are not particularly critical and are governed by such things as the volumes of liquids to be handled, the pressures to which the drain valve device is to be subjected, and similar considerations.

In the draining process, the operator presses valve operating lever 48 until the accumulated waste in the vessel 11 has been discharged. Completion of waste discharge can quickly and easily be determined by observing the absence of liquid discharge, or in the case of a vessel under pressure, the sound of gases escaping under pressure can provide an audible signal as well, as previously described.

While the invention described is illustrated in connection with particular valve operating component, and fittings, showing preferred design embodiments, it will be appreciated that details of such components, including their manner of their interconnection with each other, and with the associated vessel to be drained, may be varied without departing from the spirit of the invention disclosed. Furthermore, while the drain valve device is particularly advantageous when sued with pressure vessels, it may also be employed with vessels not under pressure, particularly where valve spring 28 is strong enough to force the disc face land 18 tightly against valve seat 26, unassisted by pressure.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A drain valve device, comprising:
  a valve with a stem-mounted valve disc activated between opened and closed positions by longitudinal movement of the stem and corresponding movement of the valve disc against and away from a valve seat, said valve seat comprising a replaceable, pressure deformable, resilient annular disc having an opening therein through which a flow of material may axially pass, and said valve disc having an inner surface facing said valve seat, said inner surface being recessed to provide a peripheral land on said inner surface, thereby limiting an area of contact between said valve seat and valve disc in the valve's closed position to the surface area of the land;
  a valve actuator mounted on said valve and adapted to exert a force on said stem, thereby moving the stem and forcing said disc away from said valve seat and thus opening the valve, wherein said valve is equipped with a spring to return it to its closed position when said force is removed; and
  wherein said valve disc has a pointed tapered cone extending from a center of a surface of said disc opposite said valve seat, said pointed tapered cone being axially aligned with said annular disc, with a pointed end of said cone positioned upstream of said flow of materials to said annular disc, and wherein said spring is conical in shape and is positioned within said valve so that its smaller end is seated against said cone.

2. A valve according to claim 1 wherein said land has a width of from about 0.035 inch, to about 0.045 inch.

3. A valve according to claim 2 wherein said stem includes a piston portion at the end of the stem opposite the end at which said valve disc is located, said piston portion having a ratio of length to diameter of not less than about 1.2 to 1.

4. A valve according to claim 1 wherein said valve seat is maintained within an annular groove within a housing such that when said disc is subjected to a predetermined pressure, said disc compresses said seat sufficiently against said housing to allow pressurized gas to escape through said valve.

5. A drain valve device according to claim 1 wherein said valve actuator comprises a lever pivotably mounted on said valve adapted to exert a force on said stem, and thereby to open said valve.

6. A drain valve device according to claim 1 wherein said valve actuator comprises a diaphragm mounted on said valve which is adapted to exert a force on an actuator piston in contact with said stem when said diaphragm is actuated by a controlling gas pressure, thereby exerting a force on said stem, and thereby opening said valve.

7. The drain valve device of claim 1 in which discharge of the valve occurs through a hole in a fitting attached to the valve, said hole having a diameter of from about 3/32 inch, to about 1/16 inch.

* * * * *